G. F. J. COLBURN.
Fruit Jar.
No. 44,852.
Patented Nov. 1, 1864.
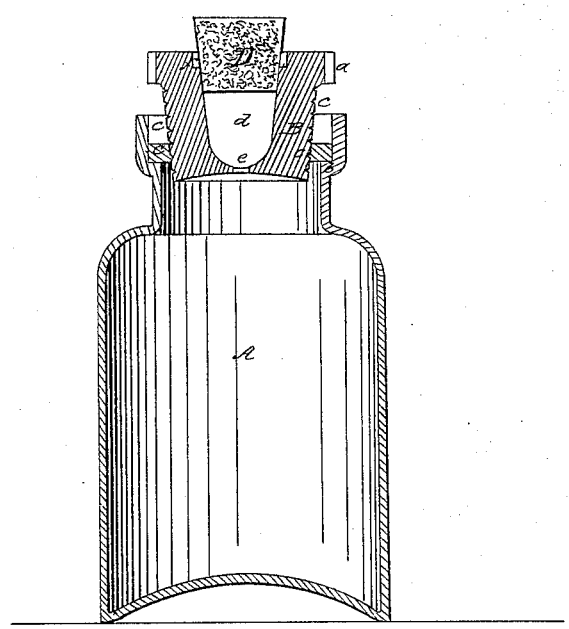
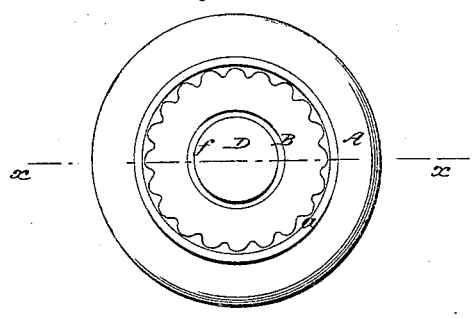
Witnesses:
Inventor:

UNITED STATES PATENT OFFICE.

G. F. J. COLBURN, OF NEWARK, NEW JERSEY.

IMPROVED STOPPER FOR JARS.

Specification forming part of Letters Patent No. 44,852, dated November 1, 1864.

*To all whom it may concern:*

Be it known that I, G. F. J. COLBURN, of Newark, in the county of Essex and State of New Jersey, have invented a new and Improved Fruit-Preserving Jar; and I do hereby declare that the following is a full, clear, and exact description thereof, which will enable those skilled in the art to make and use the same, reference being had to the accompanying drawings, forming part of this specification, in which—

Figure 1 is a vertical central section of my invention taken in the line $x\,x$, Fig. 2. Fig. 2 is a plan or top view of the same.

Similar letters of reference indicate corresponding parts.

This invention consists in the employment or use of a glass stopper of conical form, and provided with an annular india-rubber packing, and a central opening in which a cork is fitted, all being arranged in such a manner that the fruit after being placed in the jar and the latter sealed with the large stopper and packing may be covered and the jar entirely filled with the liquid or sirup, as well as the opening within the glass stopper, said opening serving as a reservoir to admit of the jar being supplied with liquid or sirup as the contents of the jar become cool and contract or decrease in bulk, thereby keeping the fruit covered, which prevents it from molding.

A represents a glass jar of such form as is generally used for containing preserved fruit, and B is a glass stopper of slightly conical form, and provided at its upper edge with a glass flange, $a$, which is serrated or fluted to prevent the hand from slipping in adjusting the stopper in the neck of the jar. The stopper is less in diameter than the neck of the jar, and the neck is formed with a shoulder, $b$, on which an annular packing, C, rests or bears when the jar is sealed. The packing C is constructed of india-rubber, and it is fitted upon the glass stopper B, the latter being pressed down through C, which causes the latter to expand and fit snugly and air-tight on the shoulder $b$, and against the inner side of the neck. In order to prevent the slipping of the glass stopper within the packing C, the former is provided with a series of beads or threads, $c$, or a screw-thread may be on the exterior of B. Either would answer. The stopper B is not solid, it being molded or cast with an opening, $d$, at its center, which is of considerable capacity and communicates with the interior of the jar A by means of a hole, $e$. (See Fig. 1.) The upper part of the opening $d$ is encompassed by a groove or recess, $f$.

The fruit is sealed as follows: After the fruit is properly cooked it is placed in the jars dry or without the sirup or liquid, the jars being immersed in boiling water, in order that the air may be expelled from them. The glass stopper B, with the packing C upon it, is then inserted into the neck of the jar and the stopper pressed down so as to expand the packing and cause it to fit air-tight within the neck of the jar. The sirup or liquid is then poured into the jar through the opening $d$ of the stopper B, the jar being filled, and also the opening $d$, and the latter is then closed by a cork, D, which is cut off flush with the top of B, and sealed perfectly air-tight by filling the recess $f$ with any suitable cement. A composition of rosin and beeswax would answer the purpose. The opening $d$ in B serves as a reservoir for the sirup, and as the latter cools and diminishes in bulk it passes down from the reservoir and will keep the fruit in the jar covered, and thereby prevent it from molding.

I am aware that fruit-preserving jars have been provided with conical glass stoppers provided with an annular packing of india-rubber, and I therefore do not claim, broadly, such device; but I do claim as new and desire to secure by Letters Patent—

A stopper, B, of glass or other suitable material, provided with a suitable packing, C, when used in combination with a central opening, $d$, communicating with the interior of the jar, and provided with a cork, D, or its equivalent, all arranged substantially as and for the purpose set forth.

G. F. J. COLBURN.

Witnesses:
WM. F. MCNAMARA,
M. M. LIVINGSTON.